(12) United States Patent
Konno et al.

(10) Patent No.: US 9,995,605 B2
(45) Date of Patent: Jun. 12, 2018

(54) PRESSURE GAUGE

(71) Applicants: PROSPINE Co., Ltd., Osaki-shi, Miyagi (JP); OKADA KEIKI MFG CO., LTD., Tokyo (JP)

(72) Inventors: Hidetoshi Konno, Miyagi (JP); Manabu Oonuma, Miyagi (JP); Nobutaka Okada, Tokyo (JP)

(73) Assignees: PROSPINE Co., Ltd., Miyagi (JP); OKADA KEIKI MFG CO., LTD., Tokyo (JP)

( * ) Notice: Subject to any disclaimer, the term of this patent is extended or adjusted under 35 U.S.C. 154(b) by 0 days. days.

(21) Appl. No.: 15/564,452

(22) PCT Filed: Apr. 15, 2016

(86) PCT No.: PCT/JP2016/062073
§ 371 (c)(1),
(2) Date: Oct. 5, 2017

(87) PCT Pub. No.: WO2016/167335
PCT Pub. Date: Oct. 20, 2016

(65) Prior Publication Data
US 2018/0073947 A1  Mar. 15, 2018

(30) Foreign Application Priority Data
Apr. 16, 2015  (JP) .................................. 2015-084106

(51) Int. Cl.
*G01L 7/04* (2006.01)
*G01D 7/04* (2006.01)
(Continued)

(52) U.S. Cl.
CPC ............... *G01D 7/04* (2013.01); *G01D 5/125* (2013.01); *G01L 19/08* (2013.01)

(58) Field of Classification Search
CPC ............ G01L 7/04; G01L 19/08; G01D 5/125
(Continued)

(56) References Cited

U.S. PATENT DOCUMENTS 4,891,987 A * 1/1990 Stockton ................ G01D 5/125
73/732
5,204,572 A * 4/1993 Ferreira ............... H02K 49/106
310/156.19
(Continued)

FOREIGN PATENT DOCUMENTS

GB   1467857 A  *  3/1977  .......... F16H 49/005
JP   S57-169609 A   10/1982
(Continued)

OTHER PUBLICATIONS

International Search Report of the International Searching Authority dated Jun. 28, 2016 issued in corresponding International patent application No. PCT/JP2016/062073 (and English translation).

*Primary Examiner* — Lisa Caputo
*Assistant Examiner* — Nathaniel T Woodward
(74) *Attorney, Agent, or Firm* — Posz Law Group, PLC

(57) ABSTRACT

A Bourdon tube pressure gauge includes: a Bourdon tube; a rotary piece rotatably attached to a first shaft arranged near a tip of the Bourdon tube; a pointer including a second shaft arranged on a side facing an outer periphery of the fan-shaped portion of the rotary piece; a first permanent magnet provided on an outer peripheral surface side of a fan-shaped portion of the rotary piece; a second permanent magnet provided at the second shaft. An outer peripheral surface of the first permanent magnet and an outer peripheral surface of the second permanent magnet each has N pole and S pole alternately magnetized at equal pitches. A magnetic member configured to relax force by which the second permanent magnet is attracted to the first permanent magnet is provided across the second permanent magnet from the first permanent magnet.

3 Claims, 4 Drawing Sheets

(51) Int. Cl.
*G01L 19/08* (2006.01)
*G01D 5/12* (2006.01)

(58) Field of Classification Search
USPC .......................................... 73/732
See application file for complete search history.

(56) References Cited

U.S. PATENT DOCUMENTS

| | | | | |
|---|---|---|---|---|
| 5,333,371 | A * | 8/1994 | Mittenbuhler | G01R 7/06 29/593 |
| 5,569,967 | A * | 10/1996 | Rode | H02K 1/2733 310/103 |
| 6,499,353 | B1 * | 12/2002 | Douglas | G01K 1/024 374/E1.004 |
| 6,949,924 | B2 * | 9/2005 | Lewis | G01L 9/0029 324/207.21 |
| 7,281,490 | B2 * | 10/2007 | Buchanan | G01D 13/22 116/204 |

FOREIGN PATENT DOCUMENTS

| | | |
|---|---|---|
| JP | S61-14312 U | 1/1986 |
| JP | H08-094485 A | 4/1996 |
| JP | H09-304204 A | 11/1997 |
| JP | 2014-219304 A | 11/2014 |

* cited by examiner

PRESSURE GAUGE

CROSS REFERENCE TO RELATED APPLICATION

This application is a U.S. national stage application of International Patent Application No. PCT/JP2016/062073 filed on Apr. 15, 2016, which claims priority to Japanese Patent Application No. 2015-084106 filed on Apr. 16, 2015, the disclosures of which are incorporated herein by reference.

TECHNICAL FIELD

The present invention relates to a pressure gauge adapted to detect a pressure of a gas, particularly, a Bourdon tube pressure gauge.

BACKGROUND

A Bourdon tube pressure gauge is widely used in order to measure pressures of various kinds of gases. The Bourdon tube pressure gauge includes a metal pipe having a flat cross-section and having an entire shape formed in a C type, a spiral type, a helical type, or the like, is obtained by applying a fact that a curvature of the metal pipe is changed in accordance with internal pressure change, and characterized in having a structure relatively simple, and the one having a measurement range up to approximately 250 MPa is commercially available.

The Bourdon tube pressure gauge generally has a mechanism in which displacement of a tip of a Bourdon tube caused by pressure change is transmitted to a rotary piece, and the pointer is rotated by a gear provided at the rotary piece and a gear provided at an outer periphery of a shaft of the pointer.

In the Bourdon tube pressure gauge having such a mechanism, since the pointer is operated by the gears, and the pointer swings due to rattle at an engagement portion of the gears, thereby causing a problem in which pressure indication becomes unstable. Furthermore, when there is rapid pressure change, there may be a problem in which the gears are worn out by hard friction between the gears.

To solve such a problem, Patent Literature 1 and Patent Literature 2 disclose techniques in which a pointer is biased in one rotary direction by attaching a spiral spring to a rotary shaft thereof. However, since displacement of a Bourdon tube is transmitted by the gears in the above-described Bourdon tube pressure gauges, there is still room for improvement in terms of wear.

As a countermeasure therefor, the applicant of the present application discloses a technique in Patent Literature 3 in which displacement of a Bourdon tube can be transmitted by magnetic force. FIG. 8 is a view illustrating a Bourdon tube pressure gauge disclosed in Patent Literature 3. In the drawing, a Bourdon tube 12 is a tube having a substantially elliptical cross-sectional shape, and having a tip thereof closed by bending the tube in a manner drawing an arc.

A substantially center of a rotary piece 13 is press-fitted to a rotary piece shaft 20, and one side thereof is connected to a tip of the Bourdon tube 12 via a rod 14. Additionally, the rotary piece 13 has the other side formed in a fan-shaped portion 13c including an arc-shaped edge centering the rotary piece shaft 20, and an arc-shaped permanent magnet 21 is fixed on an outer peripheral surface side of the fan-shaped portion 13c. The permanent magnet 21 has multiple N poles and S poles alternately arranged in a circumferential direction on a circumference thereof. The rotary piece shaft 20 is rotatably supported by a base plate not illustrated.

A pointer 17 is press-fitted and held by a pointer shaft 18. The pointer shaft 18 is rotatably supported by the base plate not illustrated. A cylindrical permanent magnet 19 is fixed to the pointer shaft 18 in the circumferential direction so as to face the permanent magnet 21 of the rotary piece 13. The permanent magnet 19 has multiple N poles and S poles are alternately arranged. Rotation of the permanent magnet 21 is transmitted to the permanent magnet 19 by magnetic coupling between the N poles and the S poles alternately arranged on the circumferential surface in each of the two permanent magnets 19 and 21.

Here, when a pressure P is applied to the Bourdon tube 12 as indicated by an arrow A, the Bourdon tube 12 is elastically deformed, and a tip thereof is displaced upward in FIG. 8. Due to displacement of the Bourdon tube 12, a right portion of the rotary piece 13 is displaced upward via the rod 14, and the arc-shaped permanent magnet 21 fixed to the rotary piece 13 is rotated. When the permanent magnet 21 is rotated, the permanent magnet 19 fixed to the pointer shaft 18 is synchronously rotated in accordance with movement of the permanent magnet 21, and the pressure P is pointed by the pointer 17 held by the pointer shaft 18.

However, in the above-described pressure gauge in the related art, there may be problems that indication accuracy of the pointer 17 is not stabilized because the pointer shaft 18 is attracted in a direction approaching the rotary piece shaft 20 by attraction force between the permanent magnets 19 and 21 respectively fixed to the rotary piece 13 and the pointer shaft 18, frictional force between the pointer shaft 18 and a member supporting the pointer shaft 18 is increased, and the frictional force acts as a load.

Additionally, when rapid pressure change is instantaneously applied to the Bourdon tube 12, there may be a problem in which the pointer 17 cannot indicate a correct pressure P because the Bourdon tube 12 is suddenly elastically deformed by a large amount, the rotary piece 13 is also displaced due to this deformation, magnetic coupling (synchronization) at a proper position between the permanent magnets 19 and 21 respectively fixed to the rotary piece 13 and the pointer shaft 18 is eliminated, and the permanent magnet 19 fixed to the pointer shaft 18 is deviated in a rotary direction, thereby causing magnetic coupling at an improper position (loss of synchronism).

PATENT LITERATURE

Patent Literature 1: JP 08-094465 A
Patent Literature 2: JP 09-304204 A
Patent Literature 3: JP 2014-219304 A

SUMMARY

The present invention is made in view of the above-described problems, and directed to providing a Bourdon tube pressure gauge in which indication accuracy of a pointer is improved by reducing frictional force between a pointer shaft and a member supporting the pointer shaft, and loss of synchronism is avoided and a pressure can be correctly indicated even in a usage environment in which a pressure may be rapidly changed.

A Bourdon tube pressure gauge includes: a Bourdon tube configured to be elastically strained by a measurement pressure introduced into inside; a rotary piece rotatably attached to a first shaft arranged near a tip of the Bourdon tube, the rotary piece including one end provided with a slit-like cam hole extending in a direction away from the first shaft and other end provided with a fan-shaped portion centering the first shaft; a rod including one end provided with a first connecting unit configured to be rotatably connected to a connecting portion provided at the tip of the Bourdon tube and other end provided with a second connecting unit configured to be connected slidably inside the cam hole; a pointer including a second shaft arranged on a side facing an outer periphery of the fan-shaped portion of the rotary piece; a first permanent magnet provided on an outer peripheral surface side of the fan-shaped portion of the rotary piece; a second permanent magnet provided at the second shaft, an outer peripheral surface of the first permanent magnet and an outer peripheral surface of the second permanent magnet each having N pole and S pole alternately magnetized at equal pitches, the outer peripheral surface of the first permanent magnet and the outer peripheral surface of the second permanent magnet facing each other at a predetermined interval on a straight line connecting a center of the first shaft to a center of the second shaft; and a mechanism configured to convert displacement of the tip of the Bourdon tube due to an elastic strain of the Bourdon tube to rotation of the pointer by the rod, the first permanent magnet, and the second permanent magnet. A magnetic member configured to relax force by which the second permanent magnet is attracted to the first permanent magnet is provided across the second permanent magnet from the first permanent magnet.

A Bourdon tube pressure gauge includes: a Bourdon tube configured to be elastically strained by a measurement pressure introduced into inside; a rotary piece rotatably attached to a first shaft arranged near a tip of the Bourdon tube, the rotary piece including one end provided with a slit-like cam hole extending in a direction away from the first shaft and other end provided with a fan-shaped portion centering the first shaft; a rod including one end provided with a first connecting unit configured to be rotatably connected to a connecting portion provided at the tip of the Bourdon tube and other end provided with a second connecting unit configured to be connected slidably inside the cam hole; a pointer including a second shaft arranged on a side facing an outer periphery of the fan-shaped portion of the rotary piece; a first permanent magnet provided on an outer peripheral surface side of the fan-shaped portion of the rotary piece; a second permanent magnet provided at the second shaft, an outer peripheral surface of the first permanent magnet and an outer peripheral surface of the second permanent magnet each having N pole and S pole alternately magnetized at equal pitches, the outer peripheral surface of the first permanent magnet and the outer peripheral surface of the second permanent magnet facing each other at a predetermined interval on a straight line connecting a center of the first shaft to a center of the second shaft; and a mechanism configured to convert displacement of the tip of the Bourdon tube due to an elastic strain of the Bourdon tube to rotation of the pointer by the rod, the first permanent magnet, and the second permanent magnet. The outer periphery of the fan-shaped portion of the rotary piece and an outer periphery of the second shaft of the pointer are respectively formed with gears in which teeth contact only when sudden displacement of the Bourdon tube is caused by pressure change.

A Bourdon tube pressure gauge includes: a Bourdon tube configured to be elastically strained by a measurement pressure introduced into inside; a rotary piece rotatably attached to a first shaft arranged near a tip of the Bourdon tube, the rotary piece including one end provided with a slit-like cam hole extending in a direction away from the first shaft and other end provided with a fan-shaped portion centering the first shaft; a rod including one end provided with a first connecting unit configured to be rotatably connected to a connecting portion provided at the tip of the Bourdon tube and other end provided with a second connecting unit configured to be connected slidably inside the cam hole; a pointer including a second shaft arranged on a side facing an outer periphery of the fan-shaped portion of the rotary piece; a first magnetic body provided on an outer peripheral surface side of the fan-shaped portion of the rotary piece; a second magnetic body provided at the second shaft, an outer peripheral surface of the first magnetic body and an outer peripheral surface of the second magnetic body facing each other at a predetermined interval on a straight line connecting a center of the first shaft to a center of the second shaft; and a mechanism configured to convert displacement of the tip of the Bourdon tube due to an elastic strain of the Bourdon tube to rotation of the pointer by the rod, the first magnetic body, and the second magnetic body. One of the first magnetic body and a second magnetic body is a permanent magnet having an outer peripheral surface on which N poles and S poles are alternately magnetized at equal pitches, and the other one is a soft magnetic body having an outer peripheral surface on which projecting and recessed shapes are formed at pitches substantially equal to the magnetized pitches.

In the Bourdon tube pressure gauge of the present invention, since force by which the second permanent magnet is attracted to the first permanent magnet can be reduced, the frictional force between the pointer shaft acting as the load of the pointer and the member supporting the pointer shaft can be reduced, and stable indication accuracy of the pointer can be obtained.

Additionally, in the case where synchronization between the first magnet and the second magnet is eliminated when the pressure applied to the Bourdon tube is rapidly changed, and then the rotary piece held to the Bourdon tube via the rod is sharply displaced, magnetic coupling between the first magnet and the second permanent magnet is returned to a proper position and synchronization is restored by mutual contact between the teeth of the gears formed on the rotary piece and the second shaft of the pointer respectively, and therefore, correct indication can be achieved even in the usage environment in which a pressure may be rapidly changed.

DETAILED DESCRIPTION

Embodiments of a pressure gauge of the present invention will be described below with reference to the drawings.

First Embodiment

Figure 1:
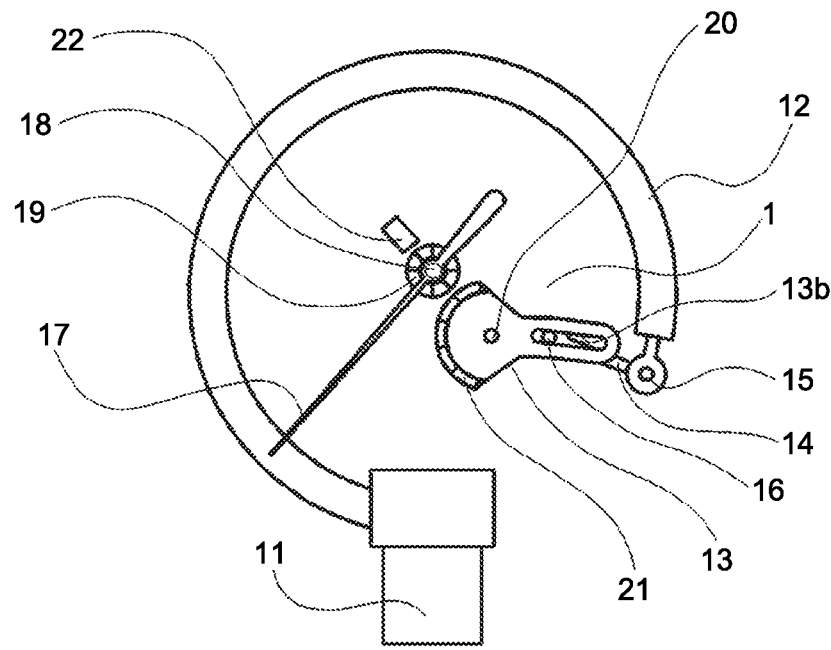
FIG. 1 is a front view of a first embodiment of a Bourdon tube pressure gauge according to the present invention.
Figure 2:
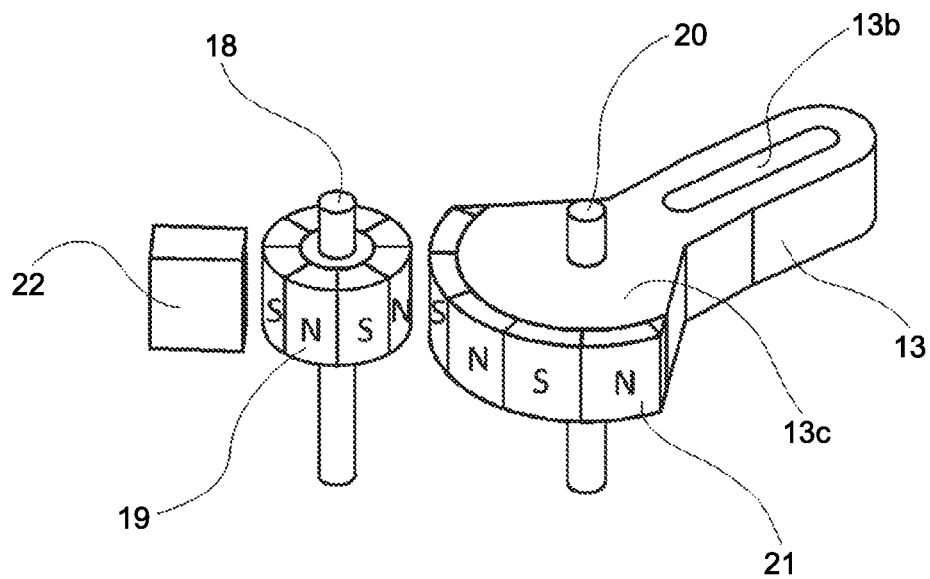
FIG. 2 is an enlarged perspective view of a pressure indication conversion mechanism according to the first embodiment.

FIGS. 1 and 2 illustrate a first embodiment of a pressure gauge according to the present invention. FIG. 1 is a front view of a first embodiment of the present invention, and FIG. 2 is an enlarged perspective view of a pressure indication conversion mechanism 1 described later.

In FIG. 1, a base end portion of a Bourdon tube 12 is fixed to a pressure introduction pipe 11, and a measurement pressure is introduced into the Bourdon tube 12 from the pressure introduction pipe 11. When the measurement pressure is changed, the Bourdon tube 12 is elastically strained and the other end of the Bourdon tube 12 is displaced. A pin 15 serving as a first connecting unit of the rod 14 is connected to the other end portion of the Bourdon tube 12. A pin 16 serving as a second connecting unit of the rod 14 is rotatably connected to a cam hole 13b of a rotary piece 13, and displacement of the other end portion of the Bourdon tube 12 is transmitted to the rotary piece 13 of the pressure indication conversion mechanism 1. The displacement of the other end portion of the Bourdon tube 12 transmitted to the rotary piece 13 is converted to rotation of a pointer 17 by the pressure indication conversion mechanism 1.

Next, a structure of the pressure indication conversion mechanism 1 will be described with reference to FIG. 2.

The pressure indication conversion mechanism 1 includes:

the rotary piece 13 including the cam hole 13b engaged with the pin 16 (see FIG. 1) provided at a tip portion of the rod 14;

a rotary piece shaft 20 that is a first shaft for holding the rotary piece 13;

an arc-shaped permanent magnet 21 that is a first permanent magnet fixed to an outer peripheral surface side of a fan-shaped portion 13c centering the rotary piece shaft 20 provided at the rotary piece 13;

a pointer shaft 18 that is a second shaft facing the permanent magnet 21 and configured to be rotatably held by a bearing of a base plate not illustrated;

a cylindrical permanent magnet 19 that is a second permanent magnet fixed to the pointer shaft 18 by adhesion or the like; and a substantially rectangular magnetic body 22 which is a magnetic member located near the permanent magnet 19 and fixed to the base plate not illustrated by press-fitting or the like across the permanent magnet 19 from the permanent magnet 21. In each of the permanent magnet 19 and the permanent magnet 21, multiple N poles and S poles are alternately magnetized at equal pitches in an outer periphery in a circumferential direction. The permanent magnets 19 and the permanent magnet 21 are arranged in a manner keeping a gap therebetween.

Next, an operating principle of the pressure indication conversion mechanism 1 will be described with reference to FIGS. 1 and 2. When a measurement pressure introduced from the pressure introduction pipe 11 into the Bourdon tube 12 is changed, a curvature of the Bourdon tube 12 is changed, a tip portion of the Bourdon tube 12 is displaced, the rotary piece 13 that is a component of the pressure indication conversion mechanism 1 connected via the rod 14 is rotated around the rotary piece shaft 20, and the permanent magnet 21 fixed to the rotary piece 13 is also rotated.

When the permanent magnet 21 is rotated, the permanent magnet 19 is rotated by magnetic coupling between the multiple N poles and the S poles alternately magnetized on the outer peripheral surface of each of the permanent magnet 19 and the permanent magnet 21. Since the permanent magnet 19 is fixed to the pointer shaft 18, the pointer shaft 18 is rotated and the pointer 17 press-fitted to and held by the pointer shaft 18 points at a scale display portion corresponding to a measurement pressure.

The permanent magnet 19 and the permanent magnet 21 are magnetized with a plurality of the N poles and the S poles alternately at equal pitches on the respective outer peripheral surfaces thereof, and for example, an N pole of the permanent magnets 21 and an S pole of the permanent magnet 19 facing the N pole are rotated while maintaining magnetic coupling, thereby keeping synchronization between the permanent magnet 19 and the permanent magnet 21. At the same time, since an N pole of the permanent magnet 21 and an S pole of the permanent magnet 19 facing the N pole attract each other, the pointer shaft 18 is biased in a direction approaching the rotary piece shaft 20. When the pointer shaft 18 is attracted in the direction approaching the rotary piece shaft 20, frictional force between the pointer shaft 18 and a member supporting the pointer shaft 18 is increased and the frictional force acts as a load, and indication accuracy of the pointer 17 becomes unstable, which is not preferable.

However, in the first embodiment of the pressure gauge according to the present invention, the substantially rectangular magnetic body 22 is provided in the vicinity of the permanent magnet 19 fixed to the pointer shaft 18 and across the permanent magnet 19 from the permanent magnet 21 is arranged. Since the magnetic body 22 and the permanent magnet 19 are attracted to each other, the pointer shaft 18 is biased in the direction approaching the magnetic body 22.

The rotary piece shaft 20 and the magnetic body 22 are positioned at positions facing each other while setting the pointer shaft 18 at a center therebetween. Therefore, attractive force by the magnetic force between the permanent magnet 19 fixed to the pointer shaft 18 and the permanent magnet 21 fixed to the rotary piece 13 is canceled and reduced by attraction force generated between the permanent magnet 19 fixed to the pointer shaft 18 and the magnetic body 22. Consequently, the frictional force between the pointer shaft 18 and the member supporting the pointer shaft 18 is relaxed, and the indication accuracy of the pointer 17 is stabilized.

Second Embodiment

Figure 3:
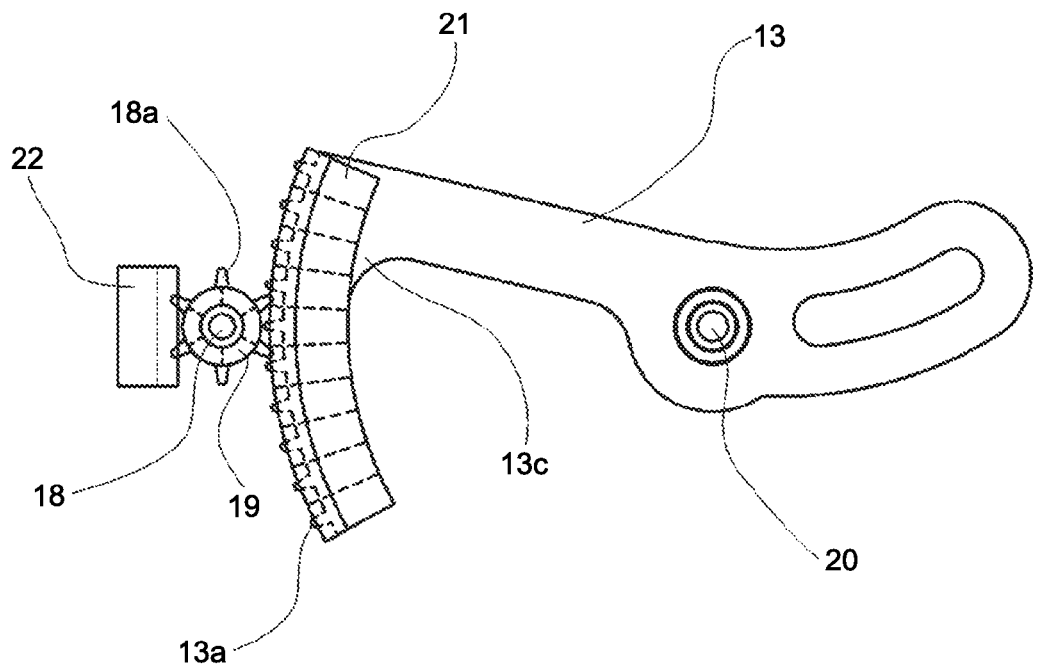
FIG. 3 is a front view of a pressure indication conversion mechanism according to a second embodiment of the present invention.
Figure 5:
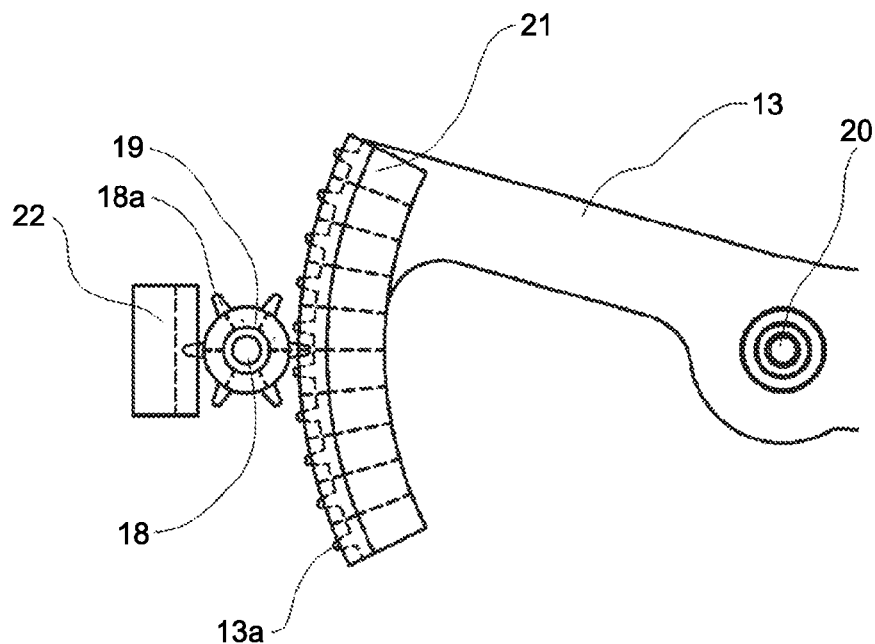
FIG. 5 is a front view to describe operation of the second embodiment.
Figure 6:
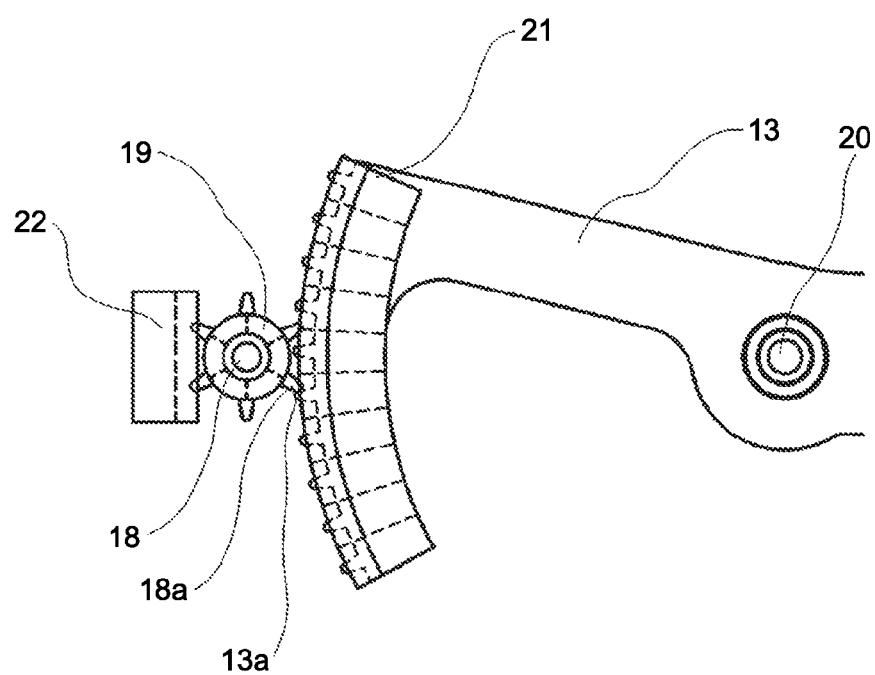
FIG. 6 is a front view to describe operation of the second embodiment.

Next, a second embodiment of a Bourdon tube pressure gauge according to the present invention will be described with reference to FIGS. 3 to 6. FIG. 3 is a front view of a pressure indication conversion mechanism 1 of the second embodiment, FIG. 4 is an enlarged perspective view of the pressure indication conversion mechanism 1, and FIGS. 5 and 6 are front views to describe operation in the second embodiment.

Figure 4:
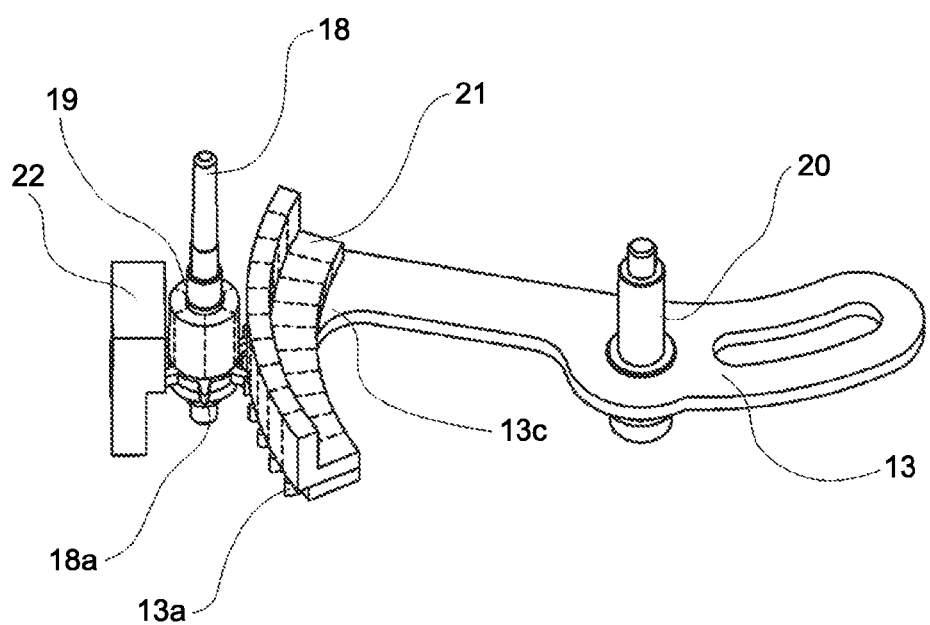
FIG. 4 is an enlarged perspective view of a pressure indication conversion mechanism according to the second embodiment.

In the second embodiment, a gear 13a is formed on an outer periphery of a fan-shaped portion 13c of a rotary piece 13 as illustrated in FIGS. 3 and 4, and a gear 18a is formed on a pointer shaft 18 so as to be engaged with the gear 13a. Other components are similar to those of a first embodiment.

As illustrated in FIG. 3, each of teeth of the gear 18a formed at the pointer shaft 18 is arranged at substantially equal pitches in an approximately boundary portion between magnetic poles of a cylindrical permanent magnet 19 fixed to the pointer shaft 18. Furthermore, each of teeth of the gear 13a formed at the rotary piece 13 is arranged at substantially equal pitches in an approximately center portion of a magnetic pole width of an arc-shaped permanent magnet 21 fixed to the rotary piece 13.

The teeth of gear 18a and gear 13a are made thinner than teeth of a general gear. When the permanent magnet 19 and the permanent magnet 21 are synchronously magnetically coupled at a proper position, the teeth of the gear 18a enter troughs of the gear 13a and the teeth of the gear 13a enter troughs of the gear 18a, and therefore, the teeth of the gear 18a do not contact the teeth of the gear 13a.

Additionally, even when the rotary piece 13 is rotated from a position in FIG. 3, and for example, rotated to a position at a ½ pitch of a magnetization pitch between an N pole and an S pole of the permanent magnet 21 as illustrated in FIG. 5, the permanent magnet 19 and the permanent magnet 21 are synchronously magnetically coupled at the proper position, and therefore, the gear 18a is rotated with the gear 13a, and the teeth of the gear 18a do not contact the teeth of the gear 13a.

As described above, in the case where the permanent magnet 19 and the permanent magnet 21 are synchronized with each other, in other words, in a use environment where pressure change applied to the Bourdon tube 12 is small, the teeth of the gear 18a do not contact the teeth of the gear 13a.

In contrast, in the case where rapid pressure change is applied to the Bourdon tube 12 and the rotary piece 13 is sharply displaced, there may be a risk that magnetic coupling (synchronization) between the permanent magnet 19 and the permanent magnet 21 at the proper position is eliminated and the permanent magnet 19 fixed to the pointer shaft 18 is deviated in a rotary direction, thereby causing magnetic coupling at an improper position (loss of synchronism). However, in the second embodiment of the present invention, when the loss of synchronism seems to occur, since the teeth of the gear 13a are engaged with the teeth of the gear 18a as illustrated in FIG. 6, the gear 18a is rotated by the gear 13a, thereby returning the permanent magnet 19 and the permanent magnet 21 to the proper positions. Consequently, synchronization between the permanent magnet 19 and the permanent magnet 21 is maintained, and the pointer 17 held by the pointer shaft 18 can provide correct indication.

As described above, in the Bourdon tube pressure gauge according to the second embodiment of the present invention, displacement of the rotary piece 13 can be normally transmitted to the pointer shaft 18 by magnetic force between the permanent magnets 19 and 21 provided at the rotary piece 13 and the pointer shaft 18 respectively, and only in the event of rapid pressure change, operation is performed by mechanical contact between the gears 13a and 18a formed at the rotary piece 13 and the pointer shaft 18 respectively, and therefore, correct indication can be achieved even in various use environments, damage to a component due to wear is suppressed, and characteristics of a long service life are maintained.

Meanwhile, the teeth of the gear 18a are arranged in the approximately boundary portion of the magnetic pole of the permanent magnet 19 and the teeth of the gear 13a are arranged in the approximately center portion of the magnetic pole width of the permanent magnet 21 in the above description of the second embodiment of the present invention, but even when the teeth of the gear 18a are arranged at an approximately center portion of a magnetic pole width of the permanent magnet 19 and the teeth of the gear 13a are arranged at an approximately boundary portion of a magnetic pole of the permanent magnet 21, effects similar to the second embodiment are obtained.

Modified Example

Figure 7:
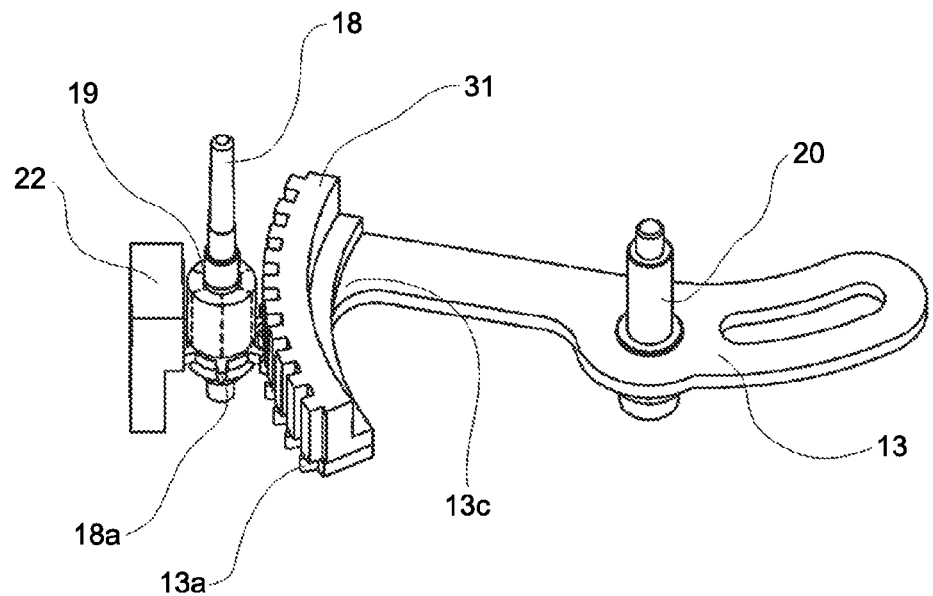
FIG. 7 is an enlarged perspective view of a pressure indication conversion mechanism according to a modified example of the second embodiment.
Figure 8:
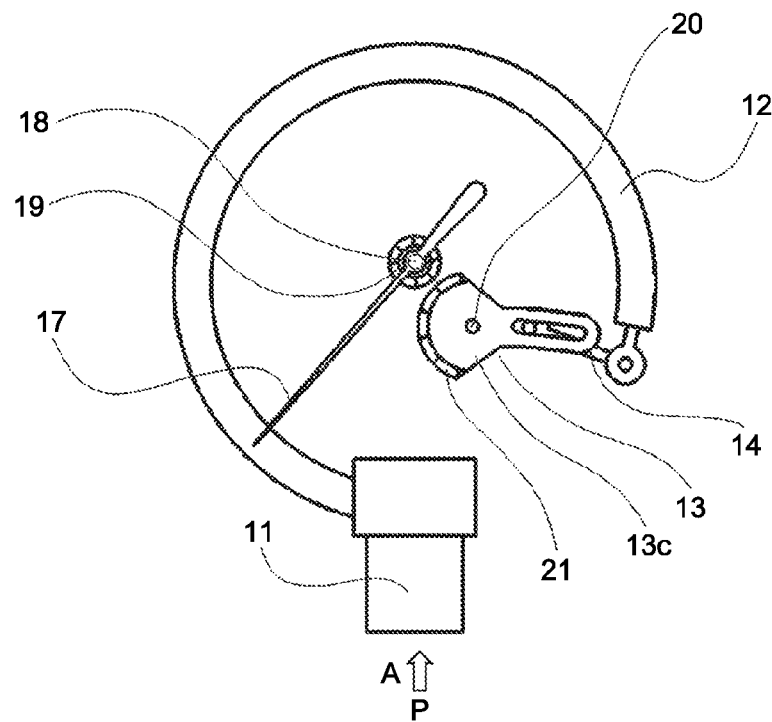
FIG. 8 is a front view schematically illustrating a pressure gauge in the related art.

Next, a modified example of the Bourdon tube pressure gauge according to the second embodiment of the present invention will be described with reference to FIG. 7. FIG. 7 is an enlarged perspective view of a pressure indication conversion mechanism 1 of the present modified example.

In the present modified example, the pressure indication conversion mechanism 1 includes a rotary piece 13, a rotary piece shaft 20 adapted to hold the rotary piece 13, an arc-shaped magnetic body 31 fixed to an outer peripheral surface side of a fan-shaped portion of the rotary piece 13, a pointer shaft 18 rotatably held by a bearing of a base plate not illustrated, a cylindrical permanent magnet 19 fixed to the pointer shaft 18 by adhesion or the like, a substantially rectangular magnetic body 22 fixed to the base plate by press-fitting or the like, a gear 13a formed on an outer periphery of the fan-shaped portion 13c of the rotary piece 13, and a gear 18a formed in the pointer shaft 18.

A plurality of projecting shapes formed long in an axial direction of the rotary piece shaft 20 and projecting outward is provided on an outer peripheral surface of the magnetic body 31 at pitches substantially same as pitches of multiple N poles and S poles magnetized on an outer peripheral surface of the permanent magnet 19.

Since a distance between a projecting shape portion of the magnetic body 31 and the outer peripheral surface of the permanent magnet 19 is narrow, a center of a magnetic pole width of the N pole or the S pole magnetized on the outer peripheral surface of the permanent magnet 19 is magnetically coupled to the projecting shape portion of the magnetic body 31 at a position facing each other due to a characteristic of a magnetic line, and rotation of the magnetic body 31 is transmitted to the permanent magnet 19. Consequently, the pointer shaft 18 is rotated, and the pointer 17 press-fitted to and held by the pointer shaft 18 points at a scale corresponding to a measurement pressure.

As described above, in the present modified example, effect similar to the second embodiment of the present invention can be obtained while using one piece of permanent magnet.

Meanwhile, the case of replacing a first permanent magnet fixed to the rotary piece 13 with the magnetic body including the plurality of projecting shapes has been described, but equivalent effects can be also obtained even in the case of keeping the first permanent magnet as a permanent magnet and replacing a second permanent magnet fixed to the pointer shaft 18 with a magnetic body having a plurality of projecting shapes. However, in this case, the magnetic body 22 that is a magnetic material is needed to be changed to a permanent magnet.

Additionally, while the modified example of the second embodiment of the present invention has been described, but similar effects can also be obtained from a modified example of the first embodiment.

INDUSTRIAL APPLICABILITY

The present invention is applicable to a Bourdon tube pressure gauge using various kinds of pressure indication conversion mechanism machines. Note that the present invention is not limited to the matters described in the above-described embodiments, and needless to mention, the present invention may include even design change within a scope including various modifications and revisions readily conceivable by a person having ordinary knowledge in the field of the present invention and without departing from the gist of the present invention.

The invention claimed is:

1. A Bourdon tube pressure gauge comprising:
a Bourdon tube configured to be elastically strained by a measurement pressure introduced into inside;
a rotary piece rotatably attached to a first shaft arranged near a tip of the Bourdon tube, the rotary piece including one end provided with a cam hole extending in a direction away from the first shaft and an other end provided with a fan-shaped portion centering the first shaft;
a rod including one end provided with a first connecting unit configured to be rotatably connected to a connecting portion provided at the tip of the Bourdon tube and an other end provided with a second connecting unit configured to be connected slidably inside the cam hole;
a pointer including a second shaft arranged on a side facing an outer periphery of the fan-shaped portion of the rotary piece;
a first permanent magnet provided on an outer peripheral surface side of the fan-shaped portion of the rotary piece;
a second permanent magnet provided at the second shaft,
an outer peripheral surface of the first permanent magnet and an outer peripheral surface of the second permanent magnet each having N pole and S pole alternately magnetized at equal pitches,
the outer peripheral surface of the first permanent magnet and the outer peripheral surface of the second permanent magnet facing each other at a predetermined interval on a straight line connecting a center of the first shaft to a center of the second shaft; and
a mechanism configured to convert displacement of the tip of the Bourdon tube due to an elastic strain of the Bourdon tube to rotation of the pointer by the rod, the first permanent magnet, and the second permanent magnet, wherein a magnetic member is provided across the second permanent magnet from the first permanent magnet and configured to relax force by which the second permanent magnet is attracted to the first permanent magnet.

2. A Bourdon tube pressure gauge comprising:
a Bourdon tube configured to be elastically strained by a measurement pressure introduced into inside;
a rotary piece rotatably attached to a first shaft arranged near a tip of the Bourdon tube, the rotary piece including one end provided with a cam hole extending in a direction away from the first shaft and an other end provided with a fan-shaped portion centering the first shaft;
a rod including one end provided with a first connecting unit configured to be rotatably connected to a connecting portion provided at the tip of the Bourdon tube and an other end provided with a second connecting unit configured to be connected slidably inside the cam hole;
a pointer including a second shaft arranged on a side facing an outer periphery of the fan-shaped portion of the rotary piece;
a first permanent magnet provided on an outer peripheral surface side of the fan-shaped portion of the rotary piece;
a second permanent magnet provided at the second shaft,
an outer peripheral surface of the first permanent magnet and an outer peripheral surface of the second permanent magnet each having N pole and S pole alternately magnetized at equal pitches,
the outer peripheral surface of the first permanent magnet and the outer peripheral surface of the second permanent magnet facing each other at a predetermined interval on a straight line connecting a center of the first shaft to a center of the second shaft; and
a mechanism configured to convert displacement of the tip of the Bourdon tube due to an elastic strain of the Bourdon tube to rotation of the pointer by the rod, the first permanent magnet, and the second permanent magnet, wherein
the outer periphery of the fan-shaped portion of the rotary piece and an outer periphery of the second shaft of the pointer are respectively formed with gears in which teeth contact only when sudden displacement of the Bourdon tube is caused by pressure change.

3. A Bourdon tube pressure gauge comprising:
a Bourdon tube configured to be elastically strained by a measurement pressure introduced into inside;
a rotary piece rotatably attached to a first shaft arranged near a tip of the Bourdon tube, the rotary piece including one end provided with a cam hole extending in a direction away from the first shaft and an other end provided with a fan-shaped portion centering the first shaft;
a rod including one end provided with a first connecting unit configured to be rotatably connected to a connecting portion provided at the tip of the Bourdon tube and an other end provided with a second connecting unit configured to be connected slidably inside the cam hole;
a pointer including a second shaft arranged on a side facing an outer periphery of the fan-shaped portion of the rotary piece;
a first magnetic body provided on an outer peripheral surface side of the fan-shaped portion of the rotary piece;
a second magnetic body provided at the second shaft,
an outer peripheral surface of the first magnetic body and an outer peripheral surface of the second magnetic body facing each other at a predetermined interval on a straight line connecting a center of the first shaft to a center of the second shaft; and
a mechanism configured to convert displacement of the tip of the Bourdon tube due to an elastic strain of the Bourdon tube to rotation of the pointer by the rod, the first magnetic body, and the second magnetic body, wherein
one of the first magnetic body and a second magnetic body is a permanent magnet having an outer peripheral surface on which N poles and S poles are alternately magnetized at equal pitches, and the other one is a soft magnetic body having an outer peripheral surface on which projecting and recessed shapes are formed at pitches substantially equal to the magnetized pitches.

* * * * *